US008029079B2

(12) United States Patent
Reich

(10) Patent No.: US 8,029,079 B2
(45) Date of Patent: Oct. 4, 2011

(54) SAFETY CABINET

(75) Inventor: Joachim Reich, Timmendorfer-Strand (DE)

(73) Assignee: Dueperthal Sicherheitstechnik GmbH & Co. KG

( * ) Notice: Subject to any disclaimer, the term of this patent is extended or adjusted under 35 U.S.C. 154(b) by 496 days.

(21) Appl. No.: 12/268,516

(22) Filed: Nov. 11, 2008

(65) Prior Publication Data

US 2009/0134756 A1 May 28, 2009

(51) Int. Cl.
*A47B 88/00* (2006.01)
*E05C 7/06* (2006.01)

(52) U.S. Cl. .......................................... 312/324; 49/367
(58) Field of Classification Search .................. 312/324, 312/326, 329, 319.1, 319.2, 319.8, 295; 49/116, 49/120, 122, 123, 366, 367
See application file for complete search history.

(56) References Cited

U.S. PATENT DOCUMENTS

| 2,820,514 | A |   | 1/1958  | Travis |              |
|-----------|---|---|---------|--------|--------------|
| 3,516,198 | A | * | 6/1970  | Lyons  | ........ 49/1 |
| 4,262,448 | A | * | 4/1981  | Flider | ...... 49/367 |
| 4,619,076 | A | * | 10/1986 | Livingston | .. 49/367 |
| 5,061,022 | A | * | 10/1991 | Meriwether | .. 312/324 |
| 5,722,202 | A | * | 3/1998  | Cooper | ...... 49/109 |
| 5,944,399 | A | * | 8/1999  | Gillispie | .. 312/324 |
| 5,992,098 | A | * | 11/1999 | Flider et al. | .. 49/367 |
| 6,729,701 | B2 | * | 5/2004 | Carter et al. | .. 312/222 |
| 2003/0001465 | A1 | * | 1/2003 | Carter et al. | .. 312/215 |

FOREIGN PATENT DOCUMENTS

| DE | 10316656     | 5/2004  |
|----|--------------|---------|
| DE | 202004004855 | 9/2004  |
| DE | 102004021912 | 10/2005 |

* cited by examiner

*Primary Examiner* — James O Hansen
(74) *Attorney, Agent, or Firm* — Andrew Wilford

(57) ABSTRACT

A safety cabinet has a plurality of walls defining a front open side and a pair of doors pivotal about respective horizontally spaced axes on the walls between a closed and an open position. Guides in the cabinet are each associated with a respective one of the doors, and respective links each have a front end connected to a respective one of the doors and a rear end shiftable front-to-back in a respective one of the guides. A connector extends between the rear ends of the links and shifts front-to-back with them. A closer is operatively engageable with the connector, and a spring applies bears on the closer to urge it against the connector for pushing same into the rear end position and closing the doors. An actuator normally holds the closer out of engagement with the connector during movement of same between the front and rear end positions.

12 Claims, 2 Drawing Sheets

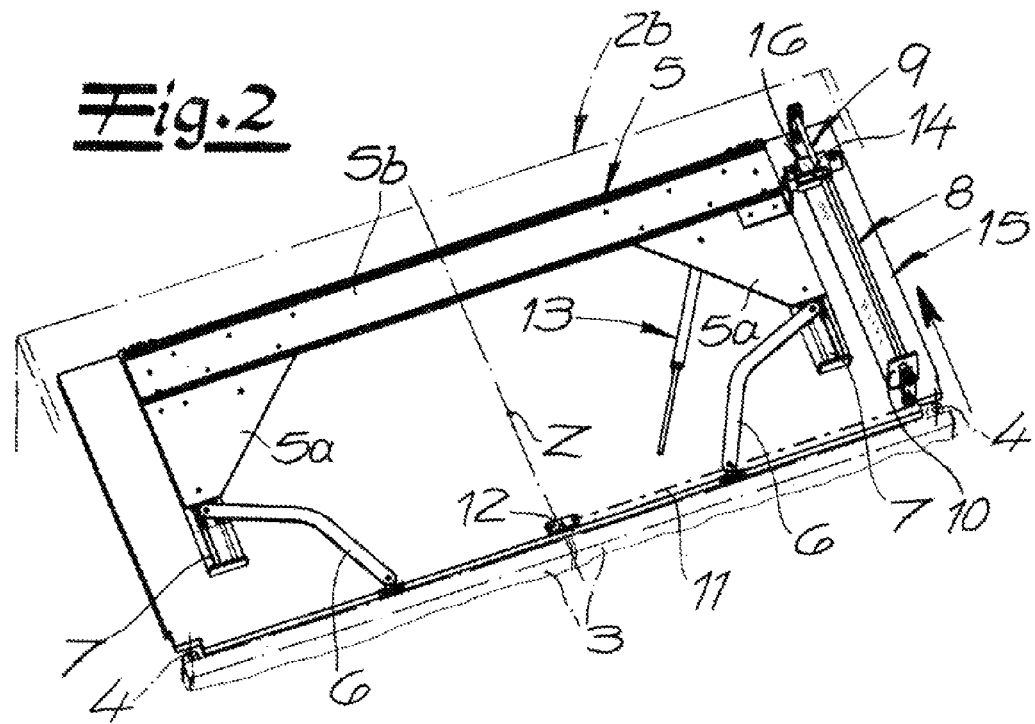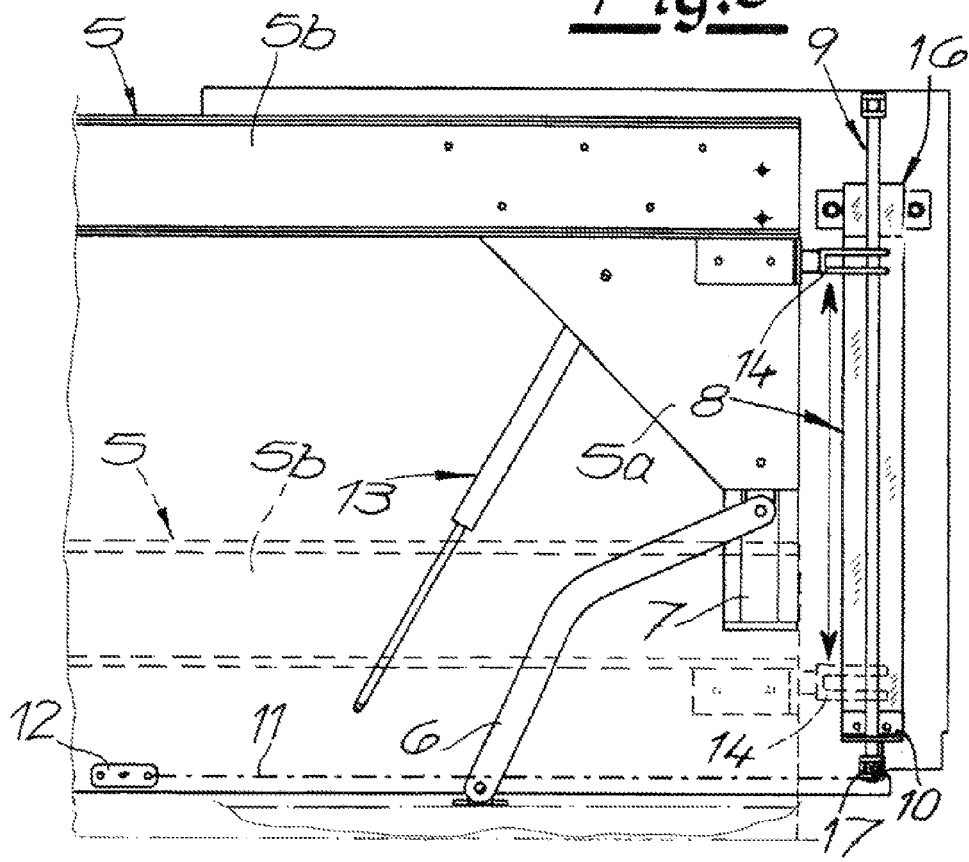

SAFETY CABINET

FIELD OF THE INVENTION

The present invention relates to a safety cabinet. More particularly this invention concerns such a lab or tool cabinet used to store dangerous chemicals and the like.

BACKGROUND OF THE INVENTION

Such a cabinet is known having at least two swing doors linked to a cabinet body, which are jointly connected to a connector movable in a guide, and with a spring unit, to which force is applied to both doors for automatic closing of the doors, e.g. in the event of a fire.

As a rule, such cabinets and/or safety cabinets are used to store safety-related products, such as chemicals, flammable liquids, etc. It is for this reason that automatic means must be provided for closing the doors in the event of a fire. This automatic closing is normally completely different from the normal operation during opening and closing of the cabinet's doors.

In the state of the art according to DE 20 2004 004 855 the spring applying force is provided along the guide for the connector and/or is integrated in the guide. The spring is a scroll spring which is directly connected to the connector. As a result, the scroll spring or the spring unit follows every movement of the connector and consequently every closing movement and opening movement of the doors. This can be problematic as the scroll spring thus takes on a, as it were, two-fold function.

On the one hand, it provides that force is applied to the doors in question in their opened position in the direction of the closed position for assisting closing. On the other hand, if however the known scroll spring also in case of fire (closed operation)—and here especially—provides for automatic closing action and the closing of the cabinet. In the last case, a fixing element is realized which is connected to the cabinet body by a connector which melts in a fire, such as solder. This results in an automatic closing of the doors in case of fire because the fixing element no longer keeps the doors open.

The described double function of the scroll spring and/or the known spring unit can conceivably result in case of fire to the spring unit no longer functioning reliably because the scroll spring and/or the fixing element and/or connector exhibit fatigue due to continuous operation. This represents a serious safety problem.

OBJECTS OF THE INVENTION

It is therefore an object of the present invention to provide an improved safety cabinet.

Another object is the provision of such an improved safety cabinet that overcomes the above-given disadvantages, in particular where the automatic closer is protected so that it can be guaranteed to work when needed.

SUMMARY OF THE INVENTION

A safety cabinet has according to the invention a plurality of walls defining a front open side and a pair of doors pivotal about respective horizontally spaced axes on the walls between a closed position closing the side and an open position giving access to the open side. Respective guides in the cabinet are each associated with a respective one of the doors, and respective links each have a front end connected to a respective one of the doors and a rear end shiftable front-to-back in a respective one of the guides. A connector extends between the rear ends of the links and shifts front-to-back with the rear ends of the links so that pivotal movement of one of the doors between the open and closed position displaces the connector between a front end position and a rear end position and is transmitted through the respective link to the connector and thence through the other guide to the other door for synchronous pivoting of the doors. According to the invention a closer is operatively engageable with the connector, and a spring applies a force to the closer to urge same into operative engagement with the connector for pushing same into the rear end position and closing the doors. An actuator normally holds the closer out of engagement with the connector during movement of same between the front and rear end positions.

Thus with the inventive system the spring unit in normal operation is functionally uncoupled from the connector and the connector is applied only in closed operation. This spring unit is not used in normal operation. That means that the spring unit does nothing during normal opening and closing action of the door. According to the invention, this opening and closing action is initiated manually and can be advantageously operated with only one hand. That is because the two doors are connected to the guide movable connector to insure that this opening and closing movement of one of the doors is transmitted synchronously and automatically through the connector to the other door. This is very helpful when chemicals are stored in the referenced cabinet, as it allows a user holding, say, a flask of a dangerous acid in one hand to open the cabinet completely with the other free hand.

In order for at least one hand to be free in stocking the cabinet, it has been shown to be particularly advantageous according to the invention to perform the opening with one hand. In this connection it is particularly advantageous if the connector is designed as a linearly traveling slide with respect to a floor or top wall of the cabinet body. That means that the connector can be advantageously provided on the floor or also on the top of the referenced cabinet body. As a rule, the connector is linear movably mounted in the two end guides.

Thus a blockage-free linear guide and displacement of the connector is guaranteed, so that only one door need be manually actuated for opening or closing. In any case, the linearly displaced connector assisting a door provides that the other door moves synchronously. The connector is provided with at least two connecting links, each door being connected to the connector through its own connecting link.

The described force ratios and in particular the linear movement of the connector are of particularly low force and blockage-free when the connector and the connecting links are symmetrically arranged relative to a central plane of the cabinet body. Also, this permits simplification of manufacture because the connecting links are identical and the connector is also provided with a mirror-symmetrical design.

In order to assist sing movement, a closing spring can be connected to the connector—in addition to the automatic-closing spring of the spring unit. In general, the closing spring provides that a manual closing movement of the doors is cushioned or damped shortly before reaching the fully closed position.

As explained above, the spring unit in normal operation is functionally uncoupled from the connector. In normal operation, the spring unit is permanently loaded. This does not specifically—unlike the state of the art according to above-cited De 20 2004 004 855 U1—result in the alternating/changing operating conditions and load states by the spring unit. That is because in normal operation it is permanently when loaded. Not until automatic closing is required does the spring unit make sure that with its assistance force is applied to the connector and the doors automatically assume their closed position.

The spring unit is advantageously essentially a longitudinally extended scroll spring when loaded. In addition, the spring unit has a closer interacting with the connector when closing the doors. When normal operation is changed to automatic closing, the spring unit and/or the formerly longitudinally extended scroll spring changes to its curled state. In so doing the closer connected to the scroll spring provides that the connector follows the path of the scroll spring.

Usually changing the scroll spring from its longitudinally extended stressed position in the curled position corresponds to the closer linked to the scroll spring on its end completing its path in a linear direction and in so doing exerts a force on the closer. As generally the spring unit is arranged parallel to a guide of the connector and preferably next to it, the force which is generated during the change of the scroll spring from its extended stressed state into the curled state of rest acts precisely along this guide and provides for the desired linear displacement of the connector to move the doors in its closed positions. As the spring unit and/or the scroll spring belonging to it is actually only used for automatic closing operation, malfunctions can be virtually excluded. In general, the closing operation of the spring unit corresponds to the case of fire, which should not however be understood to be obligatory. That is because basically the spring unit could also be released independent of a fire for example by a switch, a magnet, etc., to provide the desired automatic—and not manual—closing. As a rule, however, automatic closing is triggered by fire.

Due to the effect of the heat, the fixing element loses its fixing effect so that the scroll spring leaves its loaded condition and curls up, taking along the connector and with it the doors. The fixing element can comprise two metal plates soldered together to the scroll spring on the end for example by a wire or another bonding medium or is also directly connected. The solder melts at a certain temperature (for example 50° C.), releasing the scroll spring.

The result is a cabinet, in particular a safety cabinet which is particularly reliable with regard to automatic closing in case of fire. The above is essentially due to the fact that the spring unit according to the invention is functionally uncoupled from the connector and is involved neither in the opening nor closing movement of the doors during normal manual operation. Instead the spring unit in normal operation permanently retains its stressed position so that its functionality can easily be monitored for example using a sensor or also using a simple visual check.

Only in closed operation and/or in case of fire is the spring unit used. Because that is when a fixing element is released which up to that time had held one end of the longitudinally extended scroll spring. Normally, the fixing element is connected indirectly or directly to the closer. As soon as the scroll spring contracts, the closer provided on the end moves linearly, primarily parallel to the guide for the connector. That is because the closer is advantageously mounted an on a linear guide element and/or is displaced along this linear guide element.

BRIEF DESCRIPTION OF THE DRAWING

The above and other objects, features, and advantages will become more readily apparent from the following description, reference being made to the accompanying drawing in which:

FIG. 2 is a perspective view from above of the door-operating mechanism of the cabinet; and FIG. 3 is a large-scale top view of a detail of FIG. 2.

SPECIFIC DESCRIPTION

Figure 1:
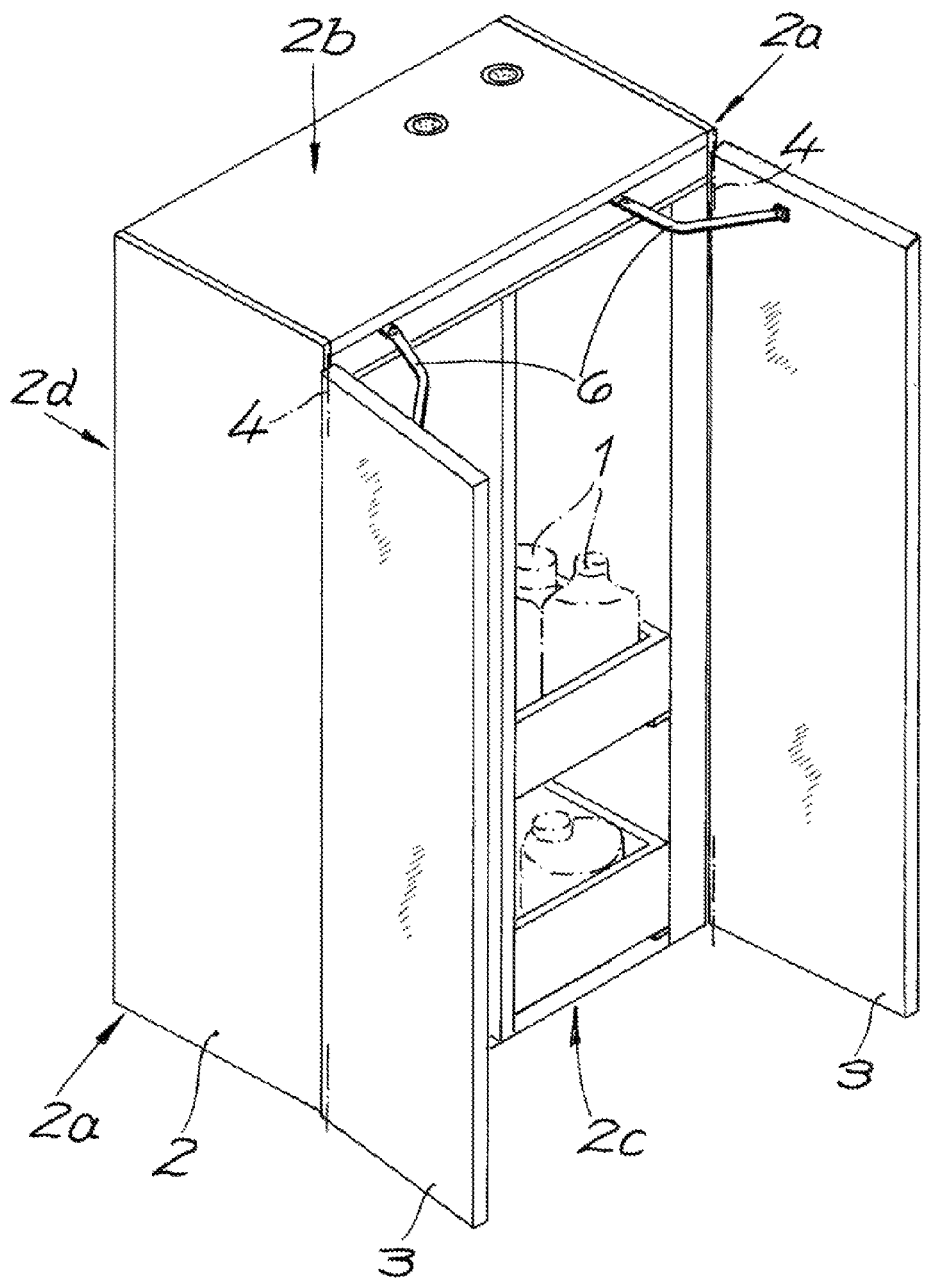
FIG. 1 is a small-scale perspective view of the safety cabinet according to the invention.

As seen in FIG. 1 a safety cabinet 2 for storing containers 1 of toxic or flammable chemicals has two vertical and rectangular side walls 2a bridged at the top by a horizontal ceiling wall, at the bottom by a floor wall 2c, and at the rear by a back wall 2d. A pair of doors 3 are pivotal about vertical axes 4 flanking an open front side of the cabinet 2 defined by front edges of the side, top, and floor walls 2a, 2b, and 2c.

Both doors 3 are connected at the upper regions by links 6 to a connector 5 largely carried on the top wall 2b. This connector 5 comprises a pair of gusset arms 5a projecting horizontally forward from respective ends of a crosswise beam or element 5b and riding in guides 7 extending horizontally parallel to each other perpendicular to the plane of the open front of the cabinet 7. The links 6 each have a front end pivoted generally centrally about a vertical axis at the top of the inside face of a respective one of the doors 3 and a rear end pivoted about another vertical axis immediately adjacent a respective one for the side walls 2a on the front or outer end of a respective one of the gusset arms 5a. Thus the entire connector 5 can slide smoothly between the rear or inner position shown in solid lines in FIGS. 2 and 3 and a front or outer position shown in dashed lines in FIG. 3. This connector 5 is in effect a slide symmetrical to a vertical central plane Z (FIG. 2) of the cabinet 2.

As soon as manual force is applied to one of the doors door 3 in the opening or closing sense, the associated connecting link 6 converts this pivotal movement of the one door 3 about its axis 4 into a linear movement of the connector 5 along the guides 7. At the other door 3, the straight-line movement of the connector 5 is in turn translated into rotation so that both doors 3 synchronously pivot by the same angle of rotation.

Because of the symmetrical design of the slide/connector 5 and the symmetrical orientations of the links 6, the two doors 3 will always open or close perfectly identically, regardless which one is actuated. Hence one-handed opening or closing of the cabinet is easy, with force smoothly transmitted from the door being pulled or pushed to the other door.

In addition to the manual opening and closing movements of the doors 3 (normal operation) these can also be closed automatically. To this end, the inventive safety cabinet is provided with a spring unit 15 comprised of at least one spring 8, guide 9, and closer 10. This spring unit 15 provides that force is applied to both doors 3 at least in the inward closing direction, that is from the dashed-line position of FIG. 3 to the solid-line position of FIG. 3.

Unlike in the prior-art such systems, in normal operation the spring unit 15 is functionally disengaged from the doors 3, their links 6, and the slide 5. Thus each time the user opens the door he/she does not also have to load the spring 8. Instead the unit 15 is normally completely static and unaffected by opening and closing of the door.

In particular, during normal operation the spring unit 15 permanently retains its loaded condition, as can be clearly seen in particular in FIG. 3. The spring 8 is a scroll spring that is normally stretched out and tensioned between an anchor 16 near the back wall 2b and a closer 10 that can slide front-to-back on the guide 9, here constituted as a simple fixed rod. An abutment 14 projecting from the gusset arm 5a extends into the path of the closer 10 between it and the back wall 2b, but as mentioned above during normal opening and closing of the doors 3 does not engage any parts of the unit 15, in particular the closer 10.

The closer 10 is held in its front position with the spring 8 tensioned by a cable 11 that extends between one end fixed to the closer 10 and passes over a roller 17 on the front end of the guide 9 to one side of a fusible link 12 exposed in the open front side above the centers thereof. The other side of this fusible link 12, which is formed by two metal plates joined together by a low-melting-point material such as bismuth, is joined to another such cable 11 connected to another such unit 15 on the other side of the cabinet 2.

Whether the cabinet is open or closed, if the link 12 is heated above its melting point, it will release the cables 11. The springs 8 will react and pull the closer 10 back to a position close to the anchors 16. If the doors 3 are open when this happens, they will be pulled closed by engagement of the closer 10 with the abutments 14 during their rearward travel. If they are closed, they will be held closed by the springs 8.

FIG. 3 also shows a closing damper 13, where a pneumatic unit that ensures gentle closing and opening of the doors 3. Such a unit is pivoted at one end on the top wall 2b and at the opposite end on one of the gussets 5a.

I claim:

1. A safety cabinet comprising:
   a plurality of walls defining a front open side;
   a pair of doors pivotal about respective horizontally spaced axes on the walls between a closed position closing the side and an open position giving access to the open side;
   respective guides in the cabinet each associated with a respective one of the doors;
   respective links each having a front end connected to a respective one of the doors and a rear end shiftable front-to-back in a respective one of the guides;
   a connector extending between the rear ends of the links and shiftable front-to-back with the rear ends of the links, whereby pivotal movement of one of the doors between the open and closed position displaces the connector between a front end position and a rear end position and is transmitted through the respective link to the connector and thence through the other guide to the other door for synchronous pivoting of the doors;
   a closer operatively engageable with the connector;
   spring means applying a force to the closer to urge same into operative engagement with the connector for pushing same into the rear end position and closing the doors; and
   actuation means for normally holding the closer out of engagement with the connector during movement of same between the front and rear end positions.

2. The safety cabinet defined in claim 1 wherein the actuation means normally maintains the spring means in a loaded condition when the closer is held out of engagement with the connector.

3. The safety cabinet defined in claim 1 wherein the spring means extends front-to-back in the cabinet.

4. The safety cabinet defined in claim 1 wherein the spring means is a scroll spring connected between a follower and an anchor fixed in the cabinet.

5. The safety cabinet defined in claim 1 wherein the actuation means includes a heat-sensitive element that releases the spring means when heated above a predetermined temperature.

6. The safety cabinet defined in claim 1 wherein the plurality of walls includes a top wall and a bottom wall and the connector is a slide provided immediately adjacent one of the walls.

7. The safety cabinet defined in claim 6 wherein the plurality of walls includes a pair of side walls extending vertically between the top and bottom wall and carrying the guides extending front-to-back and in which the slide can travel.

8. The safety cabinet defined in claim 7 wherein the rear ends of the links are connected to ends of the connector.

9. The safety cabinet defined in claim 8 wherein the links are symmetrically oriented relative to a center plane of the cabinet.

10. The safety cabinet defined in claim 1, further comprising a damper connected between the connector and the cabinet.

11. The safety cabinet defined in claim 1 wherein the connector is basically U-shaped and has a rear beam extending perpendicular to a front-to-back travel direction of the connector and a pair of ends each provided with a forwardly extending arm to a front end of which the respective link is pivoted.

12. The safety cabinet defined in claim 1 wherein the actuation means includes a fusible link normally holding the spring means in a loaded condition and the closer in a position close to the front open side of the cabinet.

* * * * *